(12) United States Patent
Guillemot et al.

(10) Patent No.: US 8,798,161 B2
(45) Date of Patent: Aug. 5, 2014

(54) ENCODING DEVICE FOR A FLOW OF DIGITAL IMAGES AND CORRESPONDING DECODING DEVICE

(75) Inventors: Christine Guillemot, Chanteple (FR); Jean-Jacques Fuchs, Rennes (FR); Laurent Guillo, La Meziere (FR)

(73) Assignees: INRIA Institut National de Recherche en Informatique et en Automatique, Le Chesnay (FR); Universite de Rennes 1, Rennes Cedex (FR); Centre National de la Recherche Scientifique (C.N.R.S), Paris (FR)

( * ) Notice: Subject to any disclaimer, the term of this patent is extended or adjusted under 35 U.S.C. 154(b) by 489 days.

(21) Appl. No.: 13/132,553

(22) PCT Filed: Dec. 1, 2009

(86) PCT No.: PCT/FR2009/001361
§ 371 (c)(1),
(2), (4) Date: Sep. 15, 2011

(87) PCT Pub. No.: WO2010/063898
PCT Pub. Date: Jun. 10, 2010

(65) Prior Publication Data
US 2011/0317767 A1 Dec. 29, 2011

(30) Foreign Application Priority Data
Dec. 3, 2008 (FR) ...................................... 08 06775

(51) Int. Cl.
*H04N 7/26* (2006.01)
(52) U.S. Cl.
CPC ............................... *H04N 7/26244* (2013.01)
USPC .................................................... 375/240.24
(58) Field of Classification Search
CPC ............................. H04N 7/50; H04N 7/26244
See application file for complete search history.

(56) References Cited

U.S. PATENT DOCUMENTS

2007/0086527 A1* 4/2007 Yan .......................... 375/240.24

OTHER PUBLICATIONS

Wiegand et al. "Overview of the H.264/AVC Video Coding Standard" IEEE Transactions on circuits and systems for video technology vol. 13, No. 7, 2003.*
Y. Zheng, et al., Intra Prediction Using Template Matching With Adaptive Illumination Compensation, Image Processing, 2008, ICIP 2008, Oct. 12, 2008, pp. 125-128.
M. Gharavi-Alkhansari, et al., A Generalized Method for Image Coding Using Fractal-Based Techniques, Journal of Visual Communication and Image Representation, vol. 8, Jun. 2, 1997, pp. 208-225.
A. Martin, et al., Sparse Representation for Image Prediction, EUSIPCO, Sep. 2007, pp. 1255-1259.

* cited by examiner

*Primary Examiner* — Sath V Perungavoor
*Assistant Examiner* — Kate Luo
(74) *Attorney, Agent, or Firm* — Meagher Emanuel Laks Goldberg & Liao, LLP

(57) ABSTRACT

An encoding device for a flow of digital images comprises:
a working memory (42) for already decoded image blocks data,
a pilot (40), mounted to analyze an incidental flow of data of digital images, and arranged to determine data to be decoded of a current block, said data to be decoded being of the complete data type or of the parameters-data type, to store the complete data in the working memory (42) as already decoded image blocks data, and to call a decoding unit (48) with the parameters-data,
the decoding unit (48) reacting to the reception of parameters-data by:
selecting some already decoded image blocks, forming an approximation base, which borders the current block according to a selected rule,
calculating an approximation of the current block, based on a linear algebraic function of the approximation base data, and
storing in the working memory (42), for the current block, already decoded image blocks data derived from this approximation.

10 Claims, 3 Drawing Sheets

ENCODING DEVICE FOR A FLOW OF DIGITAL IMAGES AND CORRESPONDING DECODING DEVICE

CROSS REFERENCE TO PRIOR APPLICATIONS

This application is a U.S. National Phase application under 35 U.S.C. §371 of International Application No. PCT/FR2009/001361, filed on Dec. 1, 2009 and claims benefit of priority to French Patent Application No. 0806775, filed on Dec. 3, 2008. The International Application was published in French on Jun. 10, 2010 as WO 2010/063898 A1 under PCT Article 21(2). All of these applications are herein incorporated by reference.

The invention relates to image processing and more particularly to video encoding architectures.

The past ten years have seen a great development in the broadcasting of the videos in electronic form. The most known format and most widespread nowadays is the format MPEG-2 used in DVDs, The quality of this standard has since been improved with the format MPEG-4, and more recently with the format H.264. However, as encoding architectures progressed, several problems gradually emerged.

Initially, it was necessary to improve quality of the rendered images. This was carried out by gradually increasing the size of the encoded files.

This made it possible to increase the encoding bit rate, i.e. the amount of data per second. Quickly, the bit rate had to be limited due to device limits.

Various architectures including the above mentioned were thus developed, in order to improve image-fidelity of compression at equivalent bit rates. These architectures resulted in a strong increase of decoding and encoding computing time costs, as architectures became more sophisticated.

Moreover, this sophistication also had. the result of making encoded information increasingly critical. Indeed, the more advanced the architectures, and the more the data to be decoded represent an "information digest", the more the transmission errors of these data tend to degrade the image which is rendered.

The invention improves the situation.

For this purpose, the invention proposes a decoding device for a data flow of digital images, comprising:
a working memory for already decoded image blocks data,
a pilot, mounted to analyze an incidental flow of data of digital images, and arranged to determine data to be decoded for a current block, said data to be decoded being of the complete data type or of the parameters-data type, to store the complete data in the working memory as already decoded image blocks data, and to call a decoding unit with the parameters-data,
the decoding unit reacting to the reception of parameters-data by:
selecting some of the already decoded image blocks, forming an approximation base, which borders the current block according to a selected rule,
calculating an approximation of the current block, based on a linear algebraic function of the approximation base data, and
storing in the working memory, for the current block, already decoded image blocks data derived from this approximation,
characterized in that the decoding unit comprises:
an approximation vicinity selector, arranged to select already decoded image blocks data corresponding to a close vicinity of the current block, and
an approximation base selector, arranged to select already decoded image blocks data corresponding to an expanded vicinity of the current block, and
a calculator, arranged to carry out the aforementioned linear algebraic function with the approximation base data to approximate the approximation vicinity data.

The invention also relates to a device of encoding of a data flow of digital images, comprising:
a working memory for already encoded image blocks data,
a pilot, mounted to analyze an incidental flow of data of digital images, and arranged to determine data to be encoded of a current block, said data to be encoded being of the complete data type or of the parameters-data type, to store the complete data in the working memory as already encoded image blocks data, and to call an encoding unit with the parameters-data.
the encoding unit reacting to the reception of parameters-data by:
selecting some of the already encoded image blocks, forming an approximation base, which borders the current block according to a selected rule,
calculating an approximation of the current block, based on a linear algebraic function of the approximation base data, and
storing in the working memory, for the current block, already encoded image blocks data and data to be decoded derived from the approximation of the current block, characterized in that the encoding unit comprises:
an approximation vicinity selector, arranged to select already encoded image blocks data corresponding to a close vicinity of the current block, and
an approximation base selector, arranged to select already encoded image blocks data corresponding to an expanded vicinity of the current block, and
a calculator, arranged to carry out the aforementioned linear algebraic function with the approximation base data to approximate the approximation vicinity data.

Such devices are particularly advantageous because they provide great in quality, while making it possible to use a wide variety of encoding schemes which make it possible to make extremely interesting compression ratio/robustness compromises.

Other characteristics and advantages of the invention will appear more readily in the following description, which is drawn from examples given on a purely illustrative and non-restrictive basis, based on the drawings on which:

The drawings and description which follow comprise, for the most part, elements of certain nature. They can thus be used not only for better understanding of the present invention, but also to contribute to its definition, if necessary.

The present description is likely to use elements subject to copyright protection. The owner of these rights does not object to identical reproduction by anyone of this patent document or its description, in the same form as in the official files.

For the remainder, the owner fully withholds his rights.

Figure 1:
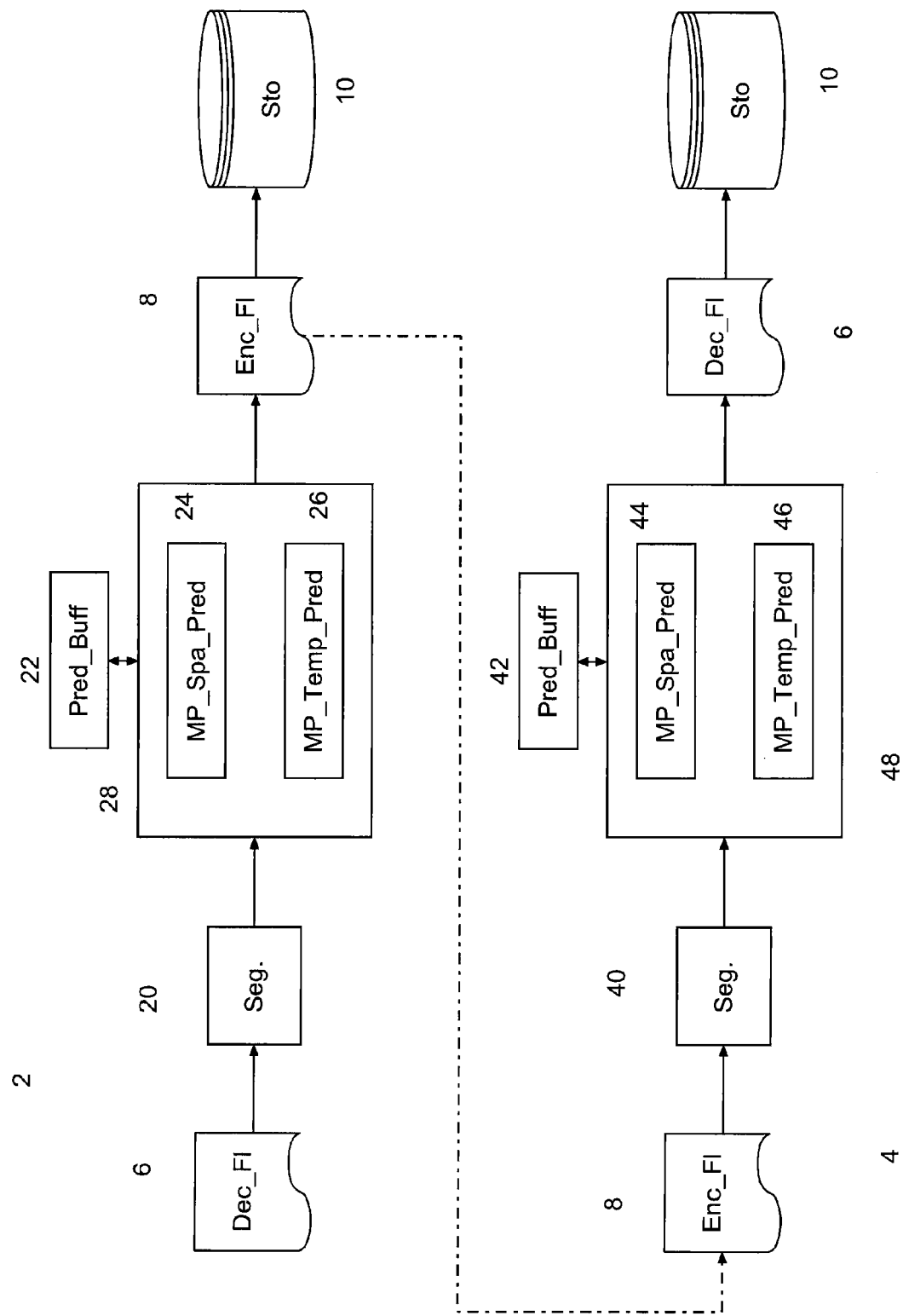
FIG. 1 represents a schematic view of an encoder and a decoder according to the invention.

FIG. 1 represents a schematic view of an encoder 2 and a decoder 4 according to the invention.

Encoder 2 receives a decoded video file 6, and transforms it into encoded video file 8 for storage in a storage memory 10.

First of all, it will be noted that, although the encoding architecture and the particular elements which make it up are particularly adapted to coding/decoding of video files, the invention is not limited to this unique field, and will be applicable with other types of files.

In the same way, by storage memory 10, one understands any type of storage memory, from the most conventional at present such as a hard disk, or a flash memory, to the more complex storage systems of the SAN or NAS type or differently stored through a network.

Conversely, decoder 4 receives an encoded file 8, and transforms it into decoded video file 6 for storage in a storage memory 10.

Encoder 2 comprises a cutter 20, a buffer memory 22, a spatial approximation unit 24, a temporal approximation unit 26, and an encoding unit 28, Decoder 4 comprises a cutter 40, a buffer memory 42, a spatial approximation unit 44, a temporal approximation unit 46, and a decoding unit 48.

As will better appear in the following, encoder 2 and decoder 4 have extremely similar structures, These similarities reflect the fact that this architecture is designed symmetrically to make decoder 4 very independent from the encoding process.

Indeed, this symmetry of structure makes it possible to ensure that decoder 4 can function in a decoupled manner with regards to encoder 2, since it functions very similarly.

As it will be seen further below, the buffer memories 22 and 42 can be seen like working memories.

The invention uses an encoding technique which aims at approaching an image block by a linear combination of other already known blocks.

This technique is much more effective in terms of quality than "motion vectors" known in the prior art. Moreover, as will be seen further below, this technique makes it possible to reduce the amount of critical data which must undergo entropic coding. This makes decoder 4 more independent from the transmitted encoded information, and thus more robust than in the former techniques.

The spatial approximation units 24 and 44 and temporal approximation units 26 and 46 implement "matching pursuit" mathematical algorithms, which make it possible to approximate an image area by a linear combination of already known blocks, while minimizing the number of elements in this combination.

The "matching pursuit" algorithms function by successive iterations, building little by little a weight vector associated with an approximation base for an input vector.

This means that, to approximate a given vector (for example a vector made up of the brightness and chrominance data of a given block of pixels) by a given approximation base (for example a set of vectors made up of the brightness and chrominance data of blocks of neighboring pixels), what is sought is a series of coefficients.

This series of coefficients is such that, by carrying out a linear combination of the vectors of the base with these coefficients, one obtains an approximation of the input vector with a selected precision threshold.

The series of coefficients can itself be represented in the shape of a vector whose values are established in an iterative manner.

The "matching pursuit" algorithms aim at producing the coefficients vector as fast as possible, and such that it contains a maximum of zeros, which makes it possible to transmit only the values which are not equal to zero (and their index in the coefficients vector).

Each operation of a "matching pursuit" algorithm is characterized by the index of the iteration, the approximation vector calculated in this iteration, and the approximated vector corresponding to the product of the approximation vector by the approximation base.

It is possible to store the intermediate results of all of the iterations, and the algorithm stops when the difference between the approximated vector and the given vector is lower than a threshold value The word "difference" should be understood as meaning the measure chosen for the algorithm, for example the Euclidian norm.

There are many alternative "matching pursuit" algorithms, and the man skilled in the art will be able to recognize them. Other algorithms than the "matching pursuit" algorithms could be implemented, which are based on a reconstruction starting from the values of surrounding blocks. The man skilled in the art will be able to also recognize them and adapt the invention if need be.

The temporal approximation units use blocks in the preceding images (backward prediction) or following images (forward prediction), or a mixture of both as reference blocks for the approximation base.

The spatial approximation units use blocks of the same image as reference blocks for the approximation base.

The concept of reference block implies cutting out an image of a given file in regular blocks.

This mentioned cutting is carried out by cutters 20 and 40. These elements have the function "to cut out" the file in current blocks, and to treat these current blocks by transmitting them to the encoding and decoding units. Cutters 20 and 40 thus play the role of pilots, processing the images one by one, and block per block.

Since the cutting of an image is conventionally made from the top left corner towards the bottom right corner while going through the image line by line of blocks, these blocks are thus selected "on top (both to the left and to the right) with respect to the block, and to the left within the line of the block" compared to a current block.

As a result, for a current block to be encoded/decoded by the spatial method, the preceding blocks on top and to the left of it must be known.

That means that the top-most and left-most blocks of an image cannot be encoded by this method and that they must be encoded/decoded differently, for example by an encoding of other blocks of the same image known as "intra", that is to say for example by application of a transformation, and then a quantization followed by an entropic coding. Alternatively, these blocks can also be encoded with the temporal method.

It goes that, if the image is traversed in a different direction, it is this direction which will define which blocks must be known for the application of the spatial method.

The Applicant observed that, for each series of 25 images approximately, the first image is in general encoded according to the spatial method, and the following ones according to the temporal method.

Thus, there is only one image out of 25 which requires an initialization. As described above, this initialization can be done by encoding of the data of the edges by transformation, quantization then entropic coding, or by coding according to the temporal method.

As a result, only the top-most edge and the left-most edge of one image out of 25 need to be effectively transmitted by encoding of the data of the edges by transformation, quantization, then entropic coding to carry out the initialization of the invention. Then, the operation proceeds as described above for the remainder of this image, as well as for the following 24 images.

Moreover, as will be seen further below, except for the blocks on the top-most and left-most edges of the image, the blocks of an image can be encoded independently by the spatial or temporal method. A marker indicating the method used will be enough for the decoding.

As now appears more clearly, two data types of the current blocks of file 8 should be distinguished:
  complete data, which are not meant to be decoded and which are the data of the blocks which are referred to in the preceding paragraphs; and
  parameters-data, which will be decoded, and which represent the major part of the data of file 8.

In the embodiment described herein, it is the cutter 40 which makes this distinction and which:
  directly stores the complete data in the working memory 42, as already decoded image blocks data;
  calls the decoding unit 48 with the parameters-data for their processing.

This distinction could however be made by the decoding unit itself.

The situation is similar on the encoder side. Indeed, as seen above, one knows among the data to encode which are the complete data and which are the parameters-data.

In the embodiment described herein, it is the cutter 20 which makes this distinction and which:
  stores directly the complete data in the working memory 22 as already encoded image blocks data;
  calls the encoding unit 28 with the parameters-data for their processing.

This distinction could however be carried out by the encoding unit itself.

The encoded file 8 can moreover comprise data to be decoded and complementary data to be decoded as parameters-data of each block. The encoded data and the complementary encoded data will be farther described with the various embodiments.

Figure 2:
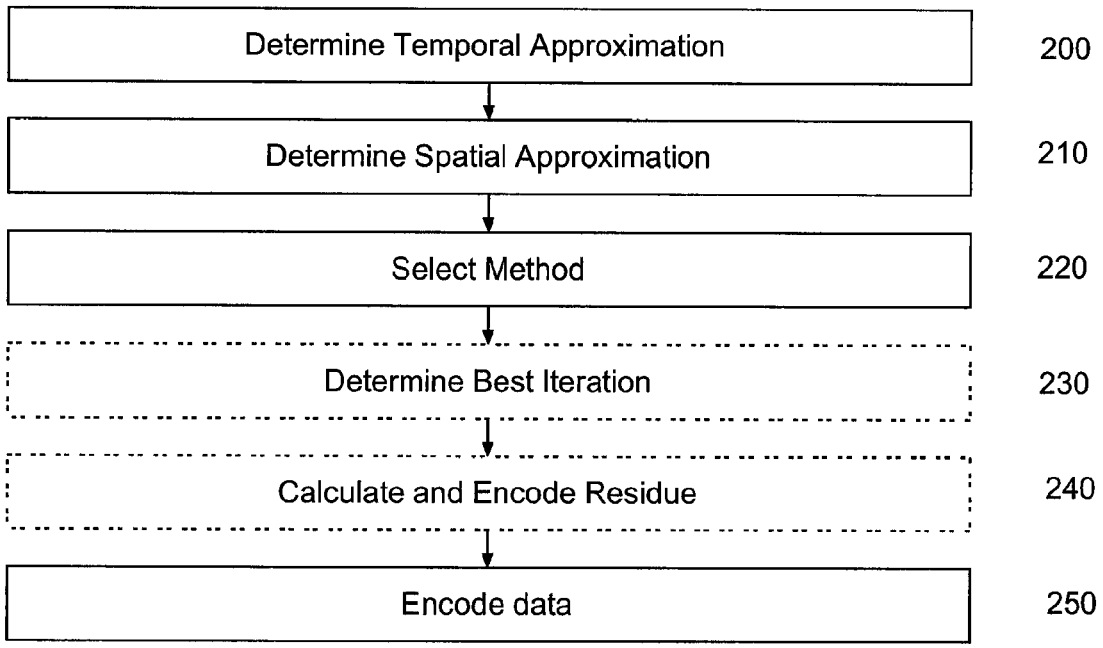
FIG. 2 represents an operation flow chart of a first embodiment of an encoder of FIG. 1.

FIG. 2 represents a generic diagram of the operation of a first embodiment for the encoder 2.

In this first embodiment, the architecture is based on the principle that the approximation units on the encoder side and on the decoder side will function in an identical manner.

To that end, the approximation of a given block is not carried out on the basis of this block, but on the basis of already encoded/decoded neighboring blocks. Thus, decoder 4 only needs to know the method which was used for calculation of the approximation of a block to recover it.

In this first embodiment, the encoding unit 28 calls the temporal approximation unit 24 in an operation 200 and the spatial approximation unit 26 in an operation 210, with the current block received from cutter 20.

During these operations, units 24 and 26 determine the approximations of the current block according to the spatial and temporal methods. Operations 200 and 210 can be carried out sequentially or in parallel.

In an operation 220, the encoding unit 28 receives these two approximations, determines that which is closest to the current block, and stores it in the buffer memory 22.

In other embodiments, the selection criterion between these approximations can be based on a compromise between the quality of the approximation (i.e. the "absolute" fidelity of the approximation) and the bit rate (quantity of information to be transmitted) for the complementary data (residue and/or iteration number).

Operation 220 can be followed by two optional operations 230 and 240, and the encoding of the encoded data of the current block is carried out in an operation 250.

in optional operation 230, the encoding unit can further select the most favorable iteration.

As seen above, in this first embodiment, it is the vicinity of the current block which is approximated and not the current block itself.

As a result, the approximation obtained by successive iterations until reaching a fixed threshold is not necessarily the nearest to the current block.

It is indeed possible that one of the iterations produced an approximation which did not approach the vicinity with the necessary precision of the threshold, but which approached the current block in a closer way than the approximation of the last iteration.

Optional operation 230 thus makes it possible to further increase the precision of the encoding, by selecting that of the iterations which represents the best approximation of the current block.

Operation 230 can be carried out in various ways.

For example, it can be carried out sequentially with operation 220, i.e. in operation 220, the most precise method is selected, and in operation 230 the most precise iteration of the method selected in operation 220 is determined.

In another alternative, operation 230 can be incorporated in operation 220, the iteration having the best approximation of the current block for the two methods being selected among all of the iterations of the two methods.

For the execution of operation 230, it is possible to operate after operations 200 and 210 were carried out. In this case, storing the approximation resulting from each iteration of each method with its index in the buffer memory 22 will suffice.

Then, operation 230 only needs to access these approximations and to select the iteration index of the best approximation.

In another alternative, operation 230 can be simplified by slightly modifying operations 200 and 210 so that, during the iterations, they store the best approximation of the current block and its iteration index.

That can be carried, out by adding a suitable buffer in the "matching pursuit" algorithm which stores the best approximation in progress.

Then, at the end of each iteration, the obtained approximation is compared with the approximation of the buffer.

If this new approximation better approaches the current block, then it is stored in the buffer. If not, the approximation stored in the buffer is unchanged.

Thus, as soon as operations 200 and 210 end, the buffer will already hold the best spatial approximation on the one hand and temporal approximation on the other hand, and operations 220 and 230 will be carried out by selecting the best of the two approximations drawn from these operations.

At the end of operation 230, the corresponding approximation of the current block is stored in the buffer memory 22.

In another optional operation 210, the encoding unit 28 determines a residue and encodes it. The residue is calculated by making out the difference between the data to be encoded of the current block and the approximation of this block which has been just calculated. This encoding generally includes a DCT transform and a quantization to eliminate the zero or low coefficients.

The resulting data then undergo entropic coding and are stored as complementary encoded data in the encoded file.

Then, the complementary encoded data are &quantized and undergo a reverse DCT transform and are added to the approximation of the current block which corresponds to the encoded data to obtain encoded-decoded data.

These encoded-decoded data are then stored in the buffer memory 22 in lieu of the approximation of the current block.

Thus, one can consider that these data constitute "new data of encoded image block", which will replace the data to be encoded for the encoding of later blocks.

The goal of this operation is to prevent quantization noise. The fact that the encoded-decoded data are used for the encoding of later blocks makes it possible to avoid a drift due to the quantization noise on the residues.

Indeed, since the approximation of the current block is not transmitted to the decoder, the encoded-decoded data represent the data which will be available to the decoder 4 at the decoding time.

It is thus advantageous that these data are used for encoding the later blocks.

It will be noted that, in the case that operation 240 is not carried out the approximation data of the current block obtained from operation 220 which are present in the memory 22 correspond to the encoded-decoded data or already encoded image block data.

Finally, in an operation 250, the approximation type (spatial or temporal) obtained from operation 220 is encoded, and if necessary, the index of best iteration obtained from operation 230.

Figure 3:
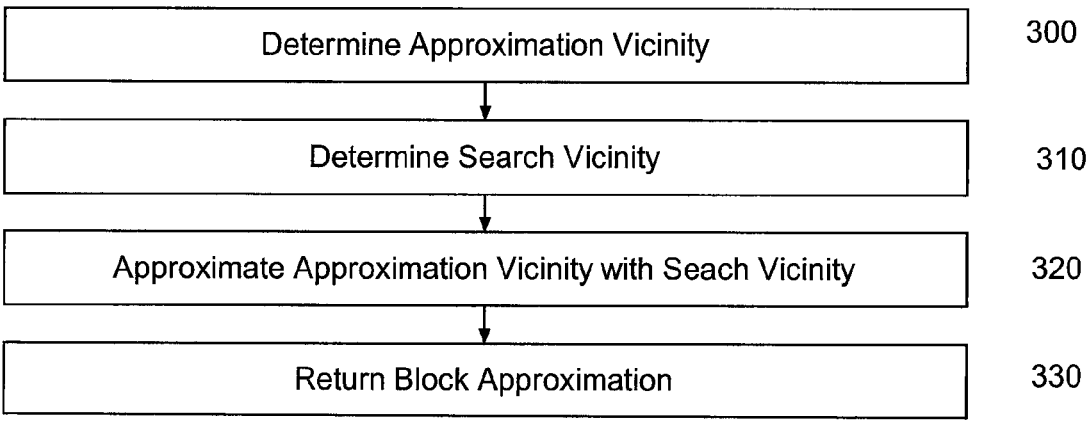
FIG. 3 represents a function of FIG. 2.

FIG. 3 represents an implementation example of the "matching pursuit" algorithm of operations 200 and 210.

In an operation 300, the approximation unit determines an approximation vicinity of the current block. It is this approximation vicinity which will represent the current block in the algorithm.

In the embodiment described herein, the approximation unit comprises an approximation vicinity selector which carries out this selection based on the coordinates of the current block.

The approximation vicinity is selected in the buffer memory 22 with directly neighboring blocks of the current block. As seen above, that allows taking into account the data available to the decoder for the encoding of the later blocks.

In a practical manner, if the current block has an index (x;y) in the image cut in blocks, that can be done by selecting blocks of coordinates (p;q) with:
p chosen in the range [x-k1;x],
q it chosen in the range [y-k2;y], and
(p;q) different from (x;y),
k1 and k2 being two indices which will determine the size of the approximation vicinity.

These indices will also influence the calculation cost of the algorithm and its precision, Effectively, in general, one can consider that if k1 and k2 are too small, then the approximation vicinity is likely to not be representative of the current block, for example in the areas showing a high contrast.

Conversely, if k1 and k2 are too large, then the approximation vicinity is likely to not be any more representative because necessarily too distinct from the current block. Moreover, the larger the vicinity, the higher the cost of calculation.

Once selected, the data associated with these blocks are put in order in a vector which will form the vector to be approximated.

It will be noted that this vector is called "causal vicinity" because it is regarded as "causally" connected to the current block.

Then, in an operation 310, the approximation unit determines a search vicinity of the current block. It is this search vicinity which will be used as the approximation base in the algorithm.

In the embodiment described herein, the approximation unit comprises an approximation base selector which carries out this selection based on the coordinates of the current block.

In the case of the spatial method, that can be done by defining a search window comprising of the blocks of index (p;q) with:
p chosen in the range [x-m;x] for q chosen in the range [y-n;y-k2-1], and
p chosen in the range [x-m;x-k1-1] for q chosen in the range [y-k2;y],
m and being indices which define the size of the search window.

This search window takes into account the fact that, for decoding with the spatial method, only the current image blocks which have already been decoded will be available to the decoder.

Consequently, to ensure the symmetry of the architecture, on the encoding side, only the "already encoded" blocks can be used. These "already encoded" blocks are those which are "on top" of the causal vicinity, and "on the left" in the same line, as described above.

In the case of the temporal method, the selection of the search window can be made by selecting blocks in a rectangle have sides having m and n sizes, centered on the current block, while taking into account the edges of the image, in one or more preceding images for following images, depending on the method) which were already encoded. In the same way as for the spatial method, the indices in and n will influence the calculation cost of the algorithm and its precision.

Once the search window is defined, the blocks are arranged as a search vicinity in the form of a matrix in which:
each column comprises the samples made of k1*k2 blocks, i.e. the same number of blocks as the causal vicinity to which the block to be encoded. is added, and
each column comprises blocks of the search window, selected for example by a sliding window which starts from the block having coordinates [x-m; y-n] and which traverses the search window from top to bottom and from left to right as defined above. The sliding window has a size k1*k2.

Thus, the matrix comprises the data of the already encoded blocks selected as the search vicinity for the block to be encoded, and, in each column, the last elements correspond to the data of the block to be encoded.

Finally, the matrix is brought down to a number of lines corresponding to that of the causal vicinity. This comes down to removing the elements of the sliding window which correspond to the data of the block to be encoded. These removed elements are stored for the following.

Then, in an operation 320, the "matching pursuit" algorithm as such is carried out as described above by a calculator, with the causal vicinity as the input vector, and the search vicinity as approximation base.

This operation can be complemented, as was described above, by the storing of the best approximation of the current block for the optional operation 230.

Finally, in an operation 330, the matrix corresponding to the search vicinity derived from the search window is restored with the values which were stored at 310, and this matrix is multiplied by the approximation (weight vector) obtained at 320.

Then, the last terms corresponding to the block to be encoded of the resulting vector are recovered and are returned as approximation of the current block.

Figure 4:
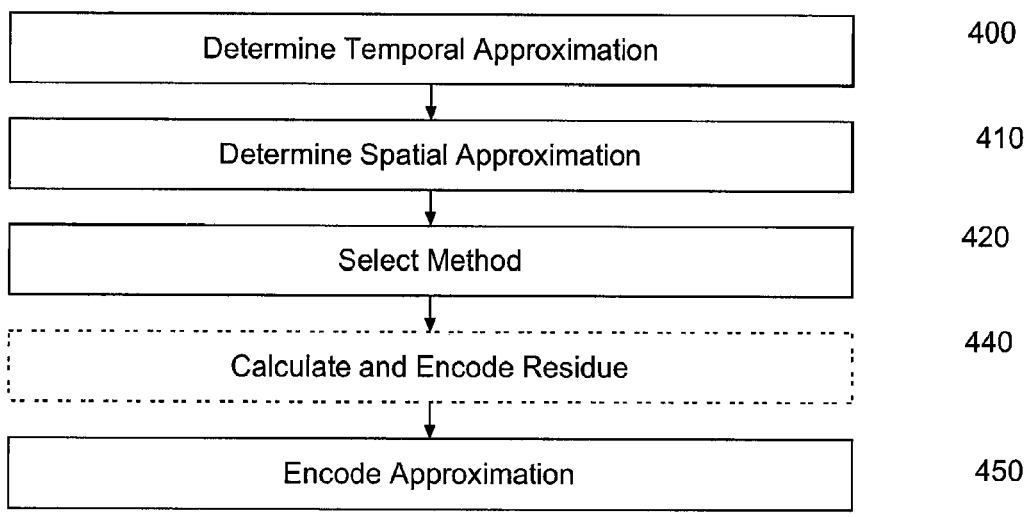
FIG. 4 represents an operation flow chart of a second embodiment of an encoder of FIG. 1.

FIG. 4 shows a generic operating diagram of a second embodiment for the encoder 2.

In this second embodiment, the architecture is based on the principle that the approximation units on the encoder side and decoder side will operate in different ways, but with data bringing about an identical result.

To that end, the approximation of a given block is done for the given block and also for blocks in a causal neighborhood thereof. Here, the decoder 4 will need to know the method used to calculate the approximation of a block to find it, as well as the weight vector that makes it possible to approximate the given block.

Figure 5:
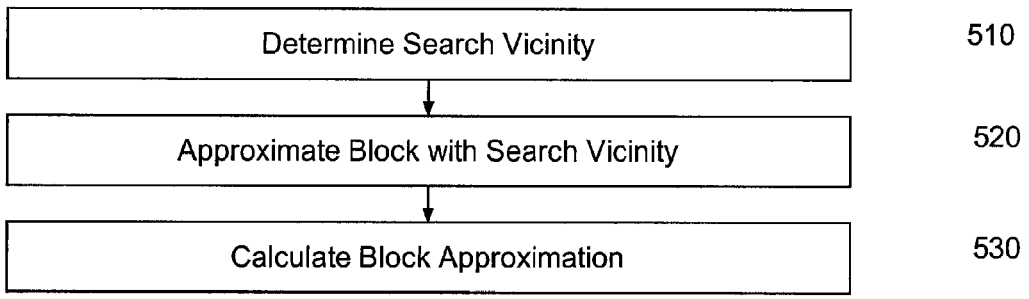
FIG. 5 represents an exemplary function of FIG. 4.

In this second embodiment, the operations 400, 110, and 420 are essentially identical to the operations 200, 210 and 220, with the exception that the approximation is slightly different, as will be better shown in relation to FIG. 5.

FIG. 5 shows an example of an embodiment of the "matching pursuit" algorithm of operations 400 and 410.

As mentioned above, this embodiment is slightly different, since it is no longer based on an approximation of the surrounding blocks, but on an approximation of the block itself.

Thus, an operation equivalent to the operation 300 is not necessary, and the approximation starts with an operation 510 for determining the search neighborhood.

It is this search neighborhood that will serve as approximation base in the algorithm.

In the case of the spatial method, this can be done by defining a search window comprising index blocks (p; q) with:

p chosen in the interval [x-m;x] for q chosen in the interval [0;y-1], and p chosen in the interval [x-m;x-1] for q=y, m and n being two indices that will determine the size of the search neighborhood and therefore the calculation cost of the algorithm and its precision.

Indeed, in general, it can be considered that if m and n are too small, then the search neighborhood risks not being representative of the current block, for example in the high contrast regions. Conversely, if m and n are too big, then the search neighborhood risks no longer being representative because it is necessarily too separate from the current block. Moreover, the bigger the neighborhood, the higher the calculation cost will be.

In the case of the temporal method, this can be done by choosing blocks in a rectangle with sides m and n, centered on the current block, taking the edges of the image into account, in the preceding images or following images depending on the method) that have already been encoded.

Once the search window is defined, the blocks are arranged in a search neighborhood in the form of a matrix whereof each column contains the values of a block.

The operation 510 is therefore functionally close to the operation 310, except that it is simpler since it is not necessary to substitute the causal neighborhood for the current block.

This simplifies the establishment of the search neighborhood and makes it possible also to include blocks that correspond to the causal neighborhood in the case of the spatial method.

Then, in an operation 520, the "matching pursuit" algorithm itself is done, with the current block as input vector, and the search neighborhood as approximation base.

As shown here, operation 520 is close to operation 320, with the exception that, as mentioned above, it is the current block itself that is approximated by the search neighborhood as well as the causal neighborhood of the current block.

Lastly, in an operation 530, the obtained approximation is returned, i.e. the approximated vector with the corresponding vector of coefficients.

It therefore emerges that the approximation methods of the first and second embodiments are very close, and their difference pertains primarily to the element being approximated.

As mentioned above, operations 400 and 410 are followed by operation 420. This operation is identical to operation 220 of FIG. 3 and aims to choose the one of the two approximations (spatial or temporal) that is best depending on established criteria (loyalty to the block, quality/throughput compromise, etc.).

Then, an optional operation 440 can be carried out. This operation is similar to the encoding operation of the residue 240 of FIG. 2. But this operation must take into account that it is the weight vector that is transmitted in this embodiment, and no longer only the encoding method.

Here this involves proceeding in the same way, i.e. encoding the residue by transformation, then quantification and entropic encoding for storage as additional encoded data. Then, entropically decoding, then dequantifying, and performing the reverse transformation.

In parallel, it is provided to quantify and dequantify the approximation drawn from operation 420 to take into account the quantification noise on this element.

Lastly, adding these two elements, and storing it in the buffer memory 22 to replace the approximation drawn from operation 420 and thus improving the encoding of the following blocks.

Lastly, in an operation 450, the approximation type (spatial or temporal) drawn from the operation 420 and the corresponding approximation vector containing the weights of the linear combination of the search base are encoded entropically and stored as encoded image block data.

In the event operation 110 has not been done, operation 450 provides for quantifying and dequantifying the approximation (weight vector) drawn from operation 420 to take into account the quantification noise on that element, and to store it in the buffer memory 22 to replace the approximation drawn from operation 420 and improve the encoding of the following blocks.

Thus, as for the first embodiment, one obtains:

data to be decoded., which is of the approximation type (spatial or temporal) drawn from operation 420 and the corresponding approximation vector containing the weights of the linear combination of the search base that are encoded by quantification and entropic encoding; and data for the already-encoded image blocks, which is the encoded-decoded data (taking into account the transmission or non-transmission of residues) and which is stored in the buffer memory.

As shown here, the main difference from the first embodiment is that it is the block itself that is approximated, and that this approximation is transmitted as encoded data with a marker of the method used to choose the blocks that served to calculate that approximation.

It is sufficient for the decoder to multiply the vector containing the weights of the linear combination by the search base designated by the method marker to make the linear combination with the data already decoded for the blocks of the search neighborhood to find the approximation of the original block.

It will be noted that in the two described embodiments, a flag or other data can be recorded in the file 8 to indicate what embodiment was used for the encoding, as well as other information, such as, for example, the convergence threshold of the matching pursuit algorithm, the dimensions of the images, etc . . . .

Figure 6:
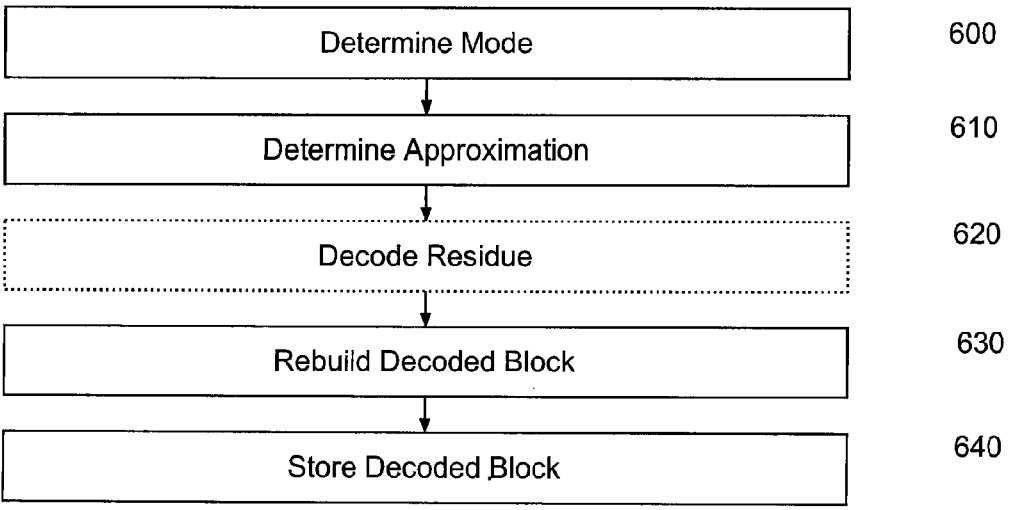
FIG. 6 represents an operation flow chart of an embodiment of a decoder of FIG. 1.

FIG. 6 represents an operation carried out by decoder 4 to decode file 8.

In a first operation 600, decoder 4 calls cutter 40 to cut out the images in current blocks and to process them. In this same operation, cutter 40 can read. a flag or another data of the file 8 which indicates which is the embodiment which was used to carry out the encoding.

In the two embodiments, that can also be derived from the approximation method marker. Cutter 40 then sends the data to be decoded to the decoding unit 48.

The decoding unit 18 can then send the data in one or the other of the spatial approximation unit 44 and the temporal approximation unit 46, with a flag indicating how the linear combination of the data to be decoded must be carried out with the search vicinity.

Then, in an operation 610, the unit 44 or 46 which received the data to be decoded operates to determine an approximation of the current block.

In the first embodiment, unit 44 or 46 operates according to FIG. 3, as the unit 24 or 26, while using the already decoded data present in buffer 42.

In the second embodiment, as described above, unit 44 or 46 carries out a linear combination of the already decoded data of the blocks of the search vicinity in buffer 42, in order to find the approximation of the original block, with a weight vector derived from the data to be decoded.

This linear combination is in fact a direct calculation of the block to decode, without any matching pursuit algorithm.

The resulting approximation is transmitted to the decoding unit 48.

Then, in an optional operation 620, the decoding unit 48 decodes the complementary data to be decoded comprising the residue in the case that they have been transmitted, and adds them in an operation 630 to the approximation received at operation 610 to recover the decoded block.

Finally, in an operation 640, the decoded block is stored in the decoded file 6 thus reconstituted, and also in the buffer memory 42 for the decoding of the later blocks.

Certain elements shown above can be implemented in various ways:
- the cutters can have the role of cutting the images in blocks only, while another element plays the part of the pilot who processes the flow of images, image by image;
- the approximation vicinity (or causal vicinity) selector, and the search vicinity selector can made as a single element which receives adapted parameters, like encoding/decoding mode and the corresponding selection parameters (x, y, k1, k2, m and n);
- the selectors described here always select blocks on top and to the left of the current block, so that the conditions related to the edges of the image are limited. Other types of selection, in particular on top and to the right of the current block could be made while taking into account these limiting conditions;
- the calculator of the spatial approximation units and temporal approximation can be shared by these units in each embodiment since it fulfills the same function;
- the spatial approximation and temporal approximation units can thus be separate or be only one calculating unit which receives the necessary parameters;
- other methods than coding by transformation, quantization followed by entropic coding can be used where it is described;
- the quantization/dequantization can be avoided by sacrificing a little performance in terms of hit rate;
- the indices of the selectors could be changed to calculate multiple approximations, and the parameters of the most powerful approximation could be encoded with the encoded data;
- the other parameters like the convergence threshold of the matching pursuit algorithm or the size of the images or other elements could be implicit for the decoder, or drawn from the file (for example based on the weight of the file or on its bit rate);
- the two embodiments could be combined for blocks of same file 6;
- the selection of the blocks in the search vicinity can be guided by a classification of these blocks according to features of the texture which they contain such as "uniform zone", "textured zone", "mainly horizontally directed contour", "mainly vertically directed contour"; only the blocks which belong to the same class as the block to be predicted will be selected, which will yield high gains in approximation calculation time;
- the linear combination can be carried out by carrying out a postprocessing like a smoothing of the data of the search vicinity, for example by applying a filter (for example a Gaussian kernel), or by applying geometrical transformations to the data of the search vicinity (using contour detection for example).

Several embodiments were described above, with optional characteristics. Every time it seemed possible, the combination of these features with each one of these embodiments was described.

However, it is the whole of the combinations of the features of the described embodiments which is part of the scope of the invention.

It must thus be understood that all the combinations of the embodiments between them and the optional features are described in present description, as well as their equivalents, even when that was not explicitly described in order to ease the understanding.

The invention also relates to a process of decoding of a data flow of digital images, comprising:
a. analyzing an incidental flow of data of digital images, to determine data to be decoded of a current block of the complete data type or of the parameters-data type,
b. storing the complete data in a working memory (42) as already decoded image blocks data,
c. decoding the parameters-data,
step c. comprising:
  i. selecting some already decoded image blocks, forming an approximation base, which borders the current block according to a selected rule,
  ii. calculating an approximation of the current block, based on a linear algebraic function of the approximation base data, and
  iii. storing in the working memory (42), for the current block, already decoded image blocks data derived from this approximation.

The process of decoding can moreover have the following features:
step c.i comprises selecting an approximation vicinity, comprising already decoded. image blocks data corresponding to a close vicinity of the current block, and step c.ii comprises selecting already decoded image blocks data corresponding to an expanded vicinity of the current block, the calculation comprising carrying out the aforementioned linear algebraic function of the approximation base data to approximate the approximation vicinity data;

step c.ii comprises carrying out the aforementioned linear algebraic function a number of times drawn from iteration data which the parameters-data comprise;

step c.i comprises selecting an approximation vicinity, comprising data of already decoded image blocks corresponding to a close vicinity of the current block, step c.ii comprising carrying out the aforementioned linear algebraic function of the approximation base data to approximate the data of the current block;

carrying out step c. according to a decoding mode selected in the group comprising a spatial decoding and a temporal decoding derived from decoding mode data which the parameters-data comprise;

step c. comprises selecting data of already decoded image blocks in the current image in the spatial mode, and data of already decoded image blocks in images contiguous with the current image in the temporal mode;

step c.iii comprises combining the approximation of the current block with corresponding complementary data to be decoded to calculate the decoded image blocks data of the current block.

The invention also relates to a process of encoding of a data flow of digital images, comprising:
a. analyzing an incidental flow of data of digital images, to determine data to be encoded of a current block of the complete data type or of the parameters-data type,
b. storing the complete data in a working memory (42) as already decoded image blocks data,
c. encoding the parameters-data,
the step c. comprising:
   i. selecting certain already encoded image blocks, forming an approximation base, which borders the current block according to a rule chosen,
   ii. calculating an approximation of the current block, based on a linear algebraic function of the approximation base data, and
   iii. storing in the working memory (42), for the current block, already encoded image blocks data and data to be decoded derived from this approximation.

The process of encoding can moreover have the following features:

step c.i comprises selecting an approximation vicinity, comprising already encoded image blocks data corresponding to a close vicinity of the current block, and step c.ii comprises selecting already encoded image blocks data corresponding to an expanded vicinity of the current block, and carrying out the aforementioned linear algebraic function with the approximation base data to approximate the approximation vicinity data;

step c.iii comprises determining iteration data and recording them in the data to be decoded;

step c.i comprises selecting an approximation vicinity, comprising already encoded image blocks data corresponding to a close vicinity of the current block, and step c.ii comprises carrying out the aforementioned linear algebraic function with the approximation base data to approximate the data of the current block;

steps c.i and c.ii are carried out for each current block according to a spatial mode and a temporal mode, and step c.iii comprises selecting an approximation among the resulting approximations, and encoding decoding mode data in the data to be decoded indicating the mode of the selected approximation;

step c. comprises selecting data of already decoded image blocks in the current image in the spatial mode, and data of image blocks already decoded in images contiguous with the current image in the temporal mode;

step c.iii comprises, for at least some of the current blocks, calculating complementary data to be decoded based on the data to be decoded and the corresponding already encoded image blocks data of these blocks, and storing them with the corresponding data to be decoded.

The invention claimed is:

1. Decoding device for a data flow of digital images, comprising:
a working memory for data of already decoded image blocks,
a pilot, mounted to analyze an incidental flow of data of digital images, and arranged to determine data to be decoded for a current block, said data to be decoded being of the complete data type or of the parameters-data type, to store the complete data in the working memory as data of already decoded image blocks, and to call a decoding unit with the parameters-data,
the decoding unit reacting to the reception of parameters-data by:
   selecting some of the already decoded image blocks located in the already decoded part of the image and beyond the approximation vicinity, said image block forming an approximation base, according to a selected rule,
   calculating an approximation of the current block, based on a linear algebraic function of the approximation base data, and
   storing in the working memory, for the current block, already decoded image blocks data derived from this approximation,
wherein the decoding unit comprises:
   an approximation vicinity selector, arranged to select already decoded image blocks data corresponding to a close vicinity of the current block, and
   an approximation base selector, arranged to select already decoded image blocks data corresponding to a wide vicinity of the current block, and
   a calculator, arranged to carry out the aforementioned linear algebraic function with the approximation base data to approximate the approximation vicinity data.

2. Device according to claim 1, wherein the parameters-data comprise iteration data, and that the calculator is arranged to carry out the aforementioned linear algebraic function a number of times drawn from the iteration data.

3. Device according to claim 1, wherein the parameters-data comprise decoding mode data indicating a decoding mode chosen in the group comprising spatial decoding and temporal decoding.

4. Device according to claim 3, wherein the approximation base selector is arranged to select data of already decoded image blocks in the current image in the spatial mode, and data of already decoded image blocks in images contiguous with the current image in the temporal mode.

5. Device according to claim 1, wherein at least some of the parameters-data comprise complementary data to be decoded, and that the decoding unit is arranged to combine the approximation of the current block with corresponding complementary data to be decoded to calculate the decoded image blocks data of the current block.

6. Device for encoding of a data flow of digital images, comprising:
   a working memory for already encoded image blocks data,
   a pilot, mounted to analyze an incidental flow of data of digital images, and arranged to determine data to be encoded of a current block being of the complete data type or of the parameters-data type, to store the complete data in the working memory as already encoded image blocks data, and to call an encoding unit with the parameters-data,
   the encoding unit reacting to the reception of parameters-data by:
      selecting some of the already decoded image blocks located in the already decoded part of the image and beyond the approximation vicinity, said image block forming an approximation base, according to a selected rule,
      calculating an approximation of the current block, based on a linear algebraic function of the approximation base data, and
      storing in the working memory, for the current block, already encoded image blocks data and data to be decoded derived from the approximation of the current block, wherein the encoding unit comprises:
   an approximation vicinity selector, arranged to select already encoded image blocks data corresponding to a close vicinity of the current block, and
   an approximation base selector, arranged to select already encoded image blocks data corresponding to an expanded vicinity of the current block, and
   a calculator, arranged to carry out the aforementioned linear algebraic function with the approximation base data to approximate the approximation vicinity data.

7. Device according to claim 6, wherein the encoding unit is arranged to derive iteration data from the calculator, and to encode the aforementioned iteration data in the data to be decoded.

8. Device according to claim 6, wherein the encoding unit is arranged to call the calculator by selecting the data of already encoded image blocks according to a spatial criterion and a temporal criterion, to select the approximation of the current block among the resulting approximations, and to encode encoding mode data in the data to be decoded indicating the criterion used to generate the aforementioned approximation of the given block.

9. Device according to claim 8, wherein the encoding mode data indicate that the approximation base selector selected data of already encoded image blocks in the current image for the spatial criterion, and data of already encoded image blocks in images contiguous with the current image for the temporal criterion.

10. Device according to claim 6, wherein, for at least some of the current blocks, the encoding unit is arranged to calculate complementary data to be decoded based on the data to be decoded and corresponding data of already encoded image blocks of these blocks, and to store them with these data to be decoded.

* * * * *